(12) United States Patent
Bohning et al.

(10) Patent No.: US 11,347,138 B1
(45) Date of Patent: *May 31, 2022

(54) SECURITY CAMERA SYSTEM

(71) Applicants: Jeffrey Bohning, Ruskin, FL (US); Kimberley A. Conway, Ruskin, FL (US)

(72) Inventors: Jeffrey Bohning, Ruskin, FL (US); Kimberley A. Conway, Ruskin, FL (US)

(73) Assignee: True North Services Inc., Ruskin, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/248,148

(22) Filed: Jan. 11, 2021

Related U.S. Application Data

(63) Continuation of application No. 17/003,689, filed on Aug. 26, 2020, now Pat. No. 10,928,712.

(51) Int. Cl.
  *G03B 17/08* (2021.01)
  *G03B 17/56* (2021.01)

(52) U.S. Cl.
  CPC ...... *G03B 17/561* (2013.01); *G03B 2217/007* (2013.01)

(58) Field of Classification Search
  USPC .......................................... 396/427; 348/143
  See application file for complete search history.

(56) References Cited

U.S. PATENT DOCUMENTS

| | | | | |
|---|---|---|---|---|
| 7,151,447 | B1* | 12/2006 | Willms | G08B 13/1654 340/540 |
| 7,331,882 | B1* | 2/2008 | White | A63B 63/083 473/479 |
| 7,703,996 | B1* | 4/2010 | Sexton, Jr. | G08B 13/19632 396/427 |
| 8,525,880 | B2* | 9/2013 | DiPoala | G08B 13/19619 348/143 |
| 9,977,312 | B1* | 5/2018 | Lefever | H04N 5/23203 |
| 10,620,507 | B2* | 4/2020 | Lefever | F16M 13/022 |
| 10,928,712 | B1* | 2/2021 | Bohning | G03B 17/561 |
| 2006/0017841 | A1* | 1/2006 | Farrell | G08B 13/19632 348/373 |
| 2014/0320646 | A1* | 10/2014 | Neufeld | H04N 5/2251 348/143 |
| 2015/0021990 | A1* | 1/2015 | Myer | F21S 9/043 307/23 |

(Continued)

*Primary Examiner* — Clayton E. LaBalle
*Assistant Examiner* — Warren K Fenwick
(74) *Attorney, Agent, or Firm* — Smith & Hopen, P.A.; Paul Murty

(57) ABSTRACT

A security device is configured to be secured to a structure to monitor an area of interest surrounding the structure. Monitoring of the area of interest is done covertly to ensure that the security device remains undetectable. The security device includes a head that is operably and removably coupled to a base. The head includes a camera having a lens that is configured to capture video data within the area of interest. The captured (or recorded) video data is transmitted to a storage device within the base for storage. For added security and/or functionally, a user can wirelessly control and monitor the security device via a user interface device from anywhere in the world.

19 Claims, 10 Drawing Sheets

(56) References Cited

U.S. PATENT DOCUMENTS

| 2015/0271375 | A1* | 9/2015 | Chien | H04N 7/183 |
| | | | | 348/159 |
| 2016/0100086 | A1* | 4/2016 | Chien | G01J 5/089 |
| | | | | 348/143 |
| 2018/0091569 | A1* | 3/2018 | Roth | H04N 7/186 |

* cited by examiner

SECURITY CAMERA SYSTEM

CROSS-REFERENCE TO RELATED APPLICATIONS

This nonprovisional application is a continuation of and claims priority to nonprovisional application Ser. No. 17/003,689, entitled "Self Contained Covert Camera System," filed Aug. 26, 2020 by the same inventor(s).

BACKGROUND OF THE INVENTION

1. Field of the Invention

This invention relates, generally, to security monitoring systems. More specifically, it relates to a security monitoring system that replaces or supplements existing lighting systems, including one or more decoy units, to avoid the appearance of conventional security systems, thereby providing a more secure area of interest.

2. Brief Description of the Prior Art

Conventional security systems include several different types of security devices, such as traditional cameras, doorbell monitoring devices, and pinhole cameras. Typical devices require an existing power source, such as a power outlet, or may rely on a battery pack for their power supplies. These implementations significantly limit the number of locations the security devices can be installed. Additionally, security unit applications that utilize solar or wind devices to generate power or recharge individual security devices are often expensive, bulky, and conspicuous. In units relying on battery packs, the large power demands of high-tech systems implementing technology, such as 4K video streaming and video processing, require routine battery pack replacements to keep up with each unit's demanding power draw. This recurrent battery replacement leads to additional maintenance and costs.

Additionally, existing cameras and security systems are often bulky and conspicuous and do not have reliable covert features. Conventional security systems are designed to look like a camera or other security monitoring device. In fact, some systems are designed such that the cameras are conspicuously placed to be noticed, thereby deterring criminals or others from occupying the area. The corresponding devices lack functionality due to their covert nature in the limited attempts to implement covert and inconspicuous security systems. In particular, the covert features often result in a limited field of view of the integrated camera, thereby severely limiting the system's performance and capabilities.

Furthermore, current smart security systems are bound by their "zone of connectivity," which includes hardwired internet, Wi-Fi, or cellular networks. In particular, rural areas or mountain retreats often lack the necessary infrastructure to main reliable cellular or landline internet connectivity. While satellite internet and communications may be effective, they are often compromised by cloud cover or inclement weather. In instances in which homes have ample internet coverage, Wi-Fi signals may not reach particular areas of the property leading to "blind spots." Furthermore, traditional security systems rely on an existing home or business networks rather than creating their own dedicated network connection without the need for a route. By piggybacking on the existing network, conventional security devices suffer from a lack of security and are prone to hacking and being controlled by unauthorized users.

In particular, U.S. Patent Publication No. 2015/0021990A1 (the '990 application) describes energy-efficient solar-powered outdoor lighting. One or more outdoor lights operate independently or may alternatively communicate with one another via a network array. The outdoor light pole may include peripheral devices such as a security camera or motion sensor. The pole is permanently affixed to a heavy base and is designed to be a conspicuous lighting unit, with or without a camera component. However, such systems as those described in the '990 patent lack easy portability due to the heavy base, and they are not covert. In fact, they require expansive infrastructure and cannot be easily integrated into an existing home and business infrastructure.

In addition, attempts have been made to provide covert security cameras that can be hidden from intruders. For example, U.S. Pat. No. 8,599,254 (the '254 patent) teaches an outdoor spotlight having a camera disposed on an outer housing. The spotlight also functions as a light-providing element for the area surrounding the spotlight. However, the structure of the spotlight is restricted to a conventional spotlight, which is commonly associated with surveillance and security. As such, under the teachings of the '254 patent, the covert camera is restricted to use in combination with a spotlight and cannot be retrofit into other housing elements that are less commonly associated with surveillance and security.

Accordingly, what is needed is an intelligent, covert, and low-profile security system that is capable of providing monitoring of the full area of interest in a productive or adaptive manner (e.g., smart system) on its own dedicated network without compromising features, quality, or control. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies, and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a covert security system capable of being installed within a variety of posts is now met by a new, useful, and nonobvious invention.

The novel structure includes a covert security device configured to be secured to a structure to monitor an area of interest surrounding the structure. The covert security device comprising a head operably and removably coupled to a base. In an embodiment, a gasket is disposed between the head and the base and is configured to provide an airtight and watertight seal. The head includes a main body disposed between a top section and a bottom section. The main body having a width greater than a width of each of the top section and the bottom section, such that a tapered top surface is formed between the main body and the top portion, and such that a bottom tapered surface is formed between the main body and the bottom portion. A camera is secured to the bottom portion. The camera includes a lens disposed on the tapered bottom surface, which is configured to conceal the camera from view. In an embodiment, the head further comprises a second camera having a lens disposed on the tapered top surface. The tapered top surface configured to conceal the second camera from view.

The head further includes a first attachment mechanism disposed on the bottom portion.

The base includes an outer surface spanning from a top end to a bottom end. The top end includes a section attachment mechanism that is configured to operably and removably secure to the first attachment mechanism of the head. The outer surface includes a plurality of projections configured to be secured within a cavity. The cavity is defined within the structure, thereby securing the base within the structure. An inner surface is opposite the outer surface and defines a cavity therein.

A visible compartment is disposed within the cavity and is configured to house a battery. The battery is configured to provide power to the covert security device. In an embodiment, the head further comprises a photovoltaic solar cell residing within a receipt formed within the top surface of the head. The photovoltaic solar cell operably coupled with the battery and configured to supply power to the battery. A covert compartment is disposed beneath the visible compartment and is separated from the visible compartment by a partition. The covert compartment houses a storage device therein. The storage device is in wireless communication with the camera and is configured to receive and store data capture by the camera. The partition is translatable between an opening configuration and a closed configuration. The covert compartment is visible in the open configuration and concealed in the closed configuration.

The covert security device is configured to be secured to the structure via the base and is configured to monitor the area of interest surrounding the structure via the head. Such that the data capture by the camera of the head is stored within the storage device of the base.

In an embodiment, the head comprises an illumination device secured within the bottom portion of the head. The illumination device is configured to illuminate the area of interest during periods of low ambient light. In an embodiment, at least a portion of the outer body of the head is transparent, thereby enabling the illumination device to illuminate the area of interest.

In an embodiment, the covert security device further comprises a first plurality of wires disposed within the head. The first plurality of wires are operably coupled to a first connector disposed at the bottom section of the head. A second plurality of wires resides within a sidewall of the base. The second plurality of wires are operably coupled to a second connector disposed at the top end of the base. When the head is coupled to the base, the first connector is positioned adjacent to the second connector, thereby operably coupled the first connector with the second connector.

In an embodiment, the covert security device is in wireless communication with a user interface device residing within an environment external to the area of interest. The user interface device configured to control the covert security device remotely.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a covert security device (security device) that is hidden within a common structure, such as a fence or an external light post, to provide inconspicuous surveillance of an area of interest. While attempts have been made to create covert security and surveillance systems, as discussed above, such attempts have failed to provide truly covert security systems. To that end, the present invention includes a covert attachment that can secure to or replace a component of an existing structure, such as a fence post. The attachment includes a head portion that is viewable from the outside when attached, as well as a base portion that is hidden from view. The head portion includes a camera as well as a lighting component to both surveil an area and hide the nature of the device itself. The base portion is receivable within the existing structure, thereby hiding the base portion from view. Since the base portion includes electronic components, such as transmitting devices and storage devices, the base portion has a unique advantage of being separable from the head portion, such that damage to the head portion does not damage the base portion. As such, even if the head portion receives damage or is removed from the structure, the base portion remains hidden within the structure, such that a user can recover information stored within the storage device of the base portion (such as, for example, camera footage received by the base portion from the camera within the head portion).

Accordingly, due to the attachment between the head portion, the base portion, and the structure itself, the present invention improves upon prior art surveillance equipment by providing a truly covert device, or a series of covert devices, that are designed to capture and store camera information without data loss. The security device is discussed in greater detail hereinbelow.

Figure 1:
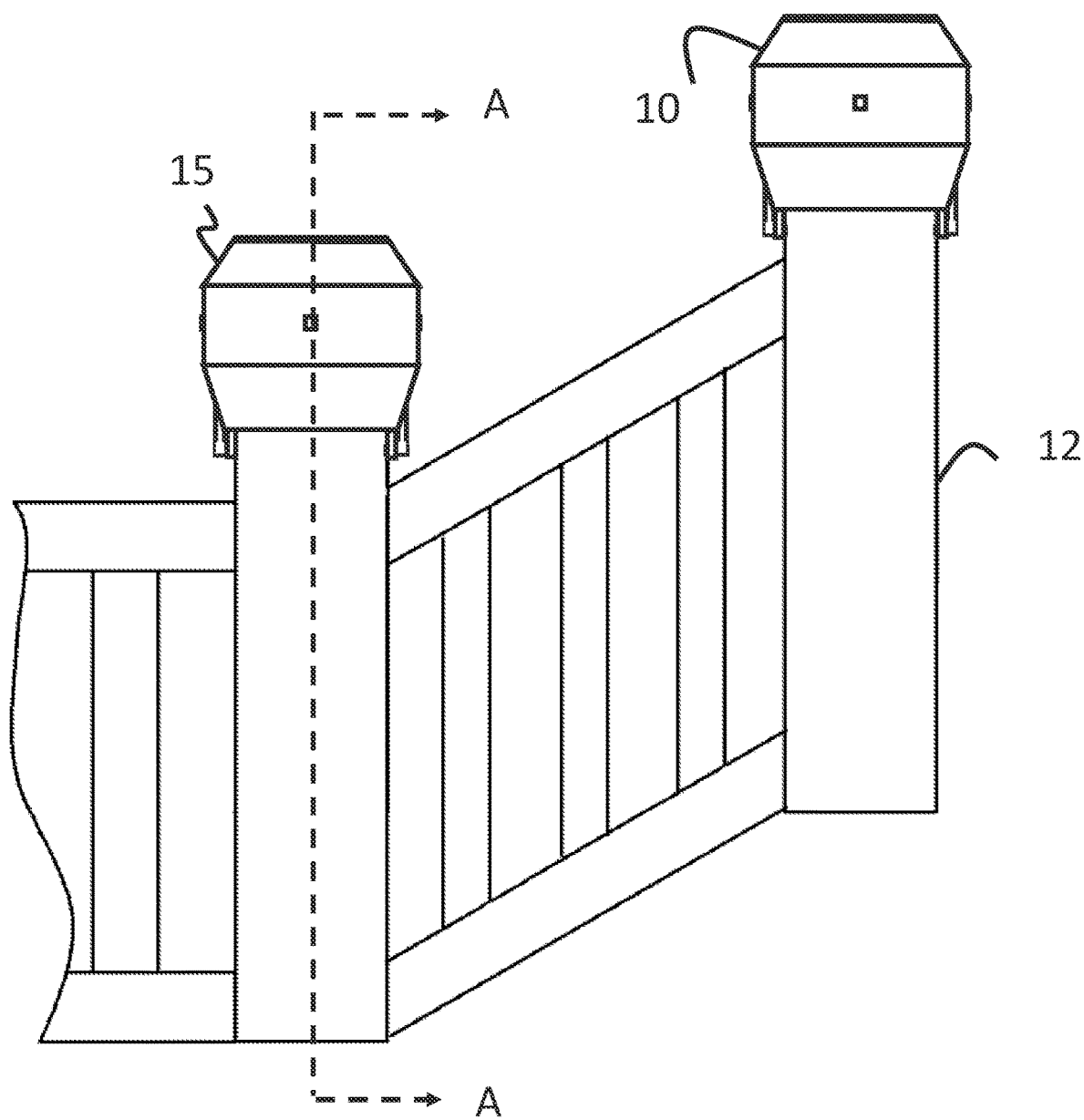
FIG. 1 is a perspective view of a security device and a decoy device disguised as a traditional light fixture and secured to a structure.

With reference to FIG. 1, low profile, and inconspicuous security device 10 is mounted to an existing home or business infrastructure (structure 12), to provide for remote monitoring of a predetermined area of interest. In particular, security device 10 is coupled to structure 12, such as a pole, fence, fixture, building, post, or other similar structure capable of supporting security device 10. In an embodiment, security device 10 is built into common structures 12 often present in, around, or near a building, such as a mailbox post, water feature, key ring holder, decorative yard, or outdoor box. The area of interest may be a backyard, front door, back door, street, business park, farmland, or any other geographic area that a user would prefer to monitor and/or secure. For example, in embodiments in which security device 10 is used to monitor a home's backyard, security device 10 can be coupled to at least a portion of an existing 4"×4", 5"×5", or 6"×6" fence post, or covertly hidden within a fountain located within the area of interest.

In situations or designs in which a single security device 10 cannot provide coverage of the entire area of interest, or in cases in which the monitoring of one or more areas of interest is required, the security system can incorporate multiple security devices 10. By combining several security devices 10 within the security system, complete or partial coverage of an area of interest can be achieved. In situations in which a higher level of security is required, such as in government monitoring applications, one or more security devices 10 may be provided to cover the same area of interest or function to act as back-up security in the event one or more of security devices 10 were to fail or be rendered non-functional. In an embodiment, decoy device 15 may also be provided that has the appearance of security device 10 but lacks the internal components to monitor the area of interest. Decoy device 15 is important to ensure that security devices 10 remain as inconspicuous as possible. Additionally, decoy device 15 reduces the overall cost of the system by having the appearance of security device 10 without having a number of the internal components, such as cameras and storage devices.

Figures 2A, 2B:
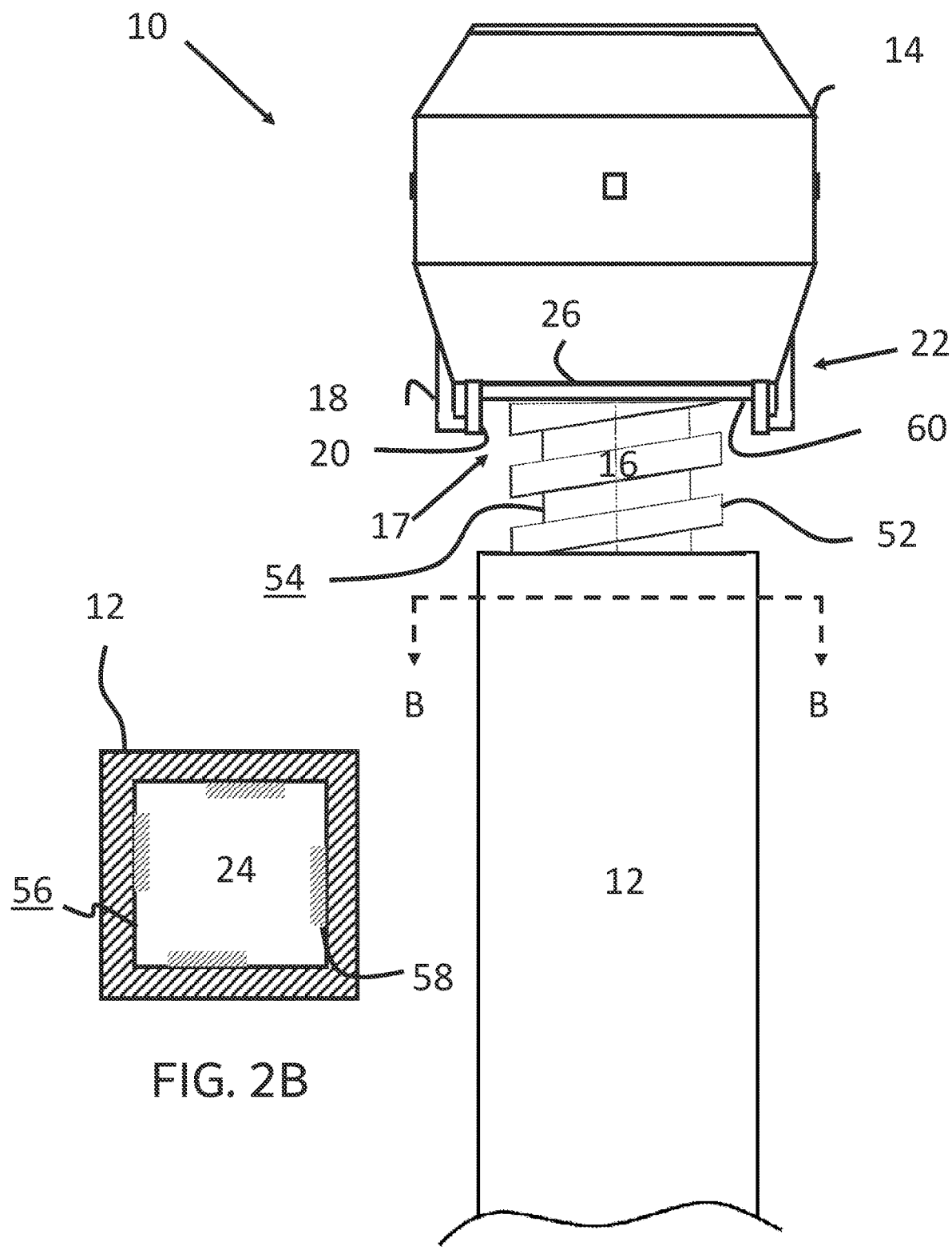
FIG. 2A is an orthogonal view of the security device partially disposed within an existing structure.
FIG. 2B is an orthogonal cut-away view of the security device and structure taken along line B-B of FIG. 2A.

As depicted in FIGS. 2A-2B, security device 10 includes head 14 operably secured to base 16. Specifically, head 14 includes first attachment mechanism 18 that operably engages with second attachment mechanism 20 of base 16, such that head 14 surmounts base 16 via first attachment mechanism 18 operably engaging with second attachment mechanism 20. In an embodiment, first attachment mechanism 18 is disposed on bottom portion 22 of head 14, and second attachment mechanism 20 is disposed at top portion 17 of base 16. First attachment mechanism 18 and second attachment mechanism are 20 secured together by a snap fitting, press-fitting, screw, nails, nuts and bolts, clamp, or any other suitable securing mechanism known in the art.

Furthermore, first attachment mechanism 18 may be any suitable structure that is complementary to that of second attachment mechanism 20, such that the interaction between first attachment mechanism 18 and second attachment mechanism 20 secures head 14 to base 16. In such embodiments, first attachment mechanism 18 may include an extension, such as a tongue, that is received within a receipt of second attachment mechanism 20. For example, when the tongue is received within the receipt, first attachment mechanism 18 cannot be inadvertently removed from within the receipt of second attachment mechanism 20. Additionally, to provide an airtight and watertight seal between the internal device environment and the external environment, when head 14 is secured to base 16, gasket 26 is disposed between head 14 and base 16.

Base 16 is sized and shaped to be received within structure 12. More specifically, as shown in FIG. 2B, base 16 is configured to be received within cavity 24 of structure 12, thereby securing security device 10 to structure 12. By securing base 16 within cavity 24, at least a portion, if not all, of base 16 is concealed from the view of a third party. To this effect, when base 16 is received within cavity 24, security device 10 maintains its covert nature by remaining disguised as a conventional light fixture or another object typically found within the area of interest.

Turning specifically to FIG. 2A, base 16 includes outer surface 54. A plurality of projections 52 extends away from outer surface 54. In addition, as shown in FIG. 2B, the internal walls 56 of structure 12, which define cavity 24, include a plurality of projection receipts 58. When secured within cavity 24, projections 52 of base 16 and operably engage with projection receipts 58 extending from internal surface 56 of cavity 24. As such, when projections 52 engage with projection receipts, 58 base 16 is secured within cavity 24. In an embodiment, projections 52 are in the form of a thread, such that base 16 can be threadedly received within cavity 24. In such an embodiment, projections 52 engage with internal surface 56 of cavity 24, thereby securing base 16 within cavity 24. The receipt of base 16 within cavity 24 of structure 12 limits the amount of security device 10 that is visible and permits first attachment mechanism 18 to operably engage with second attachment mechanism 20.

Figure 5A:
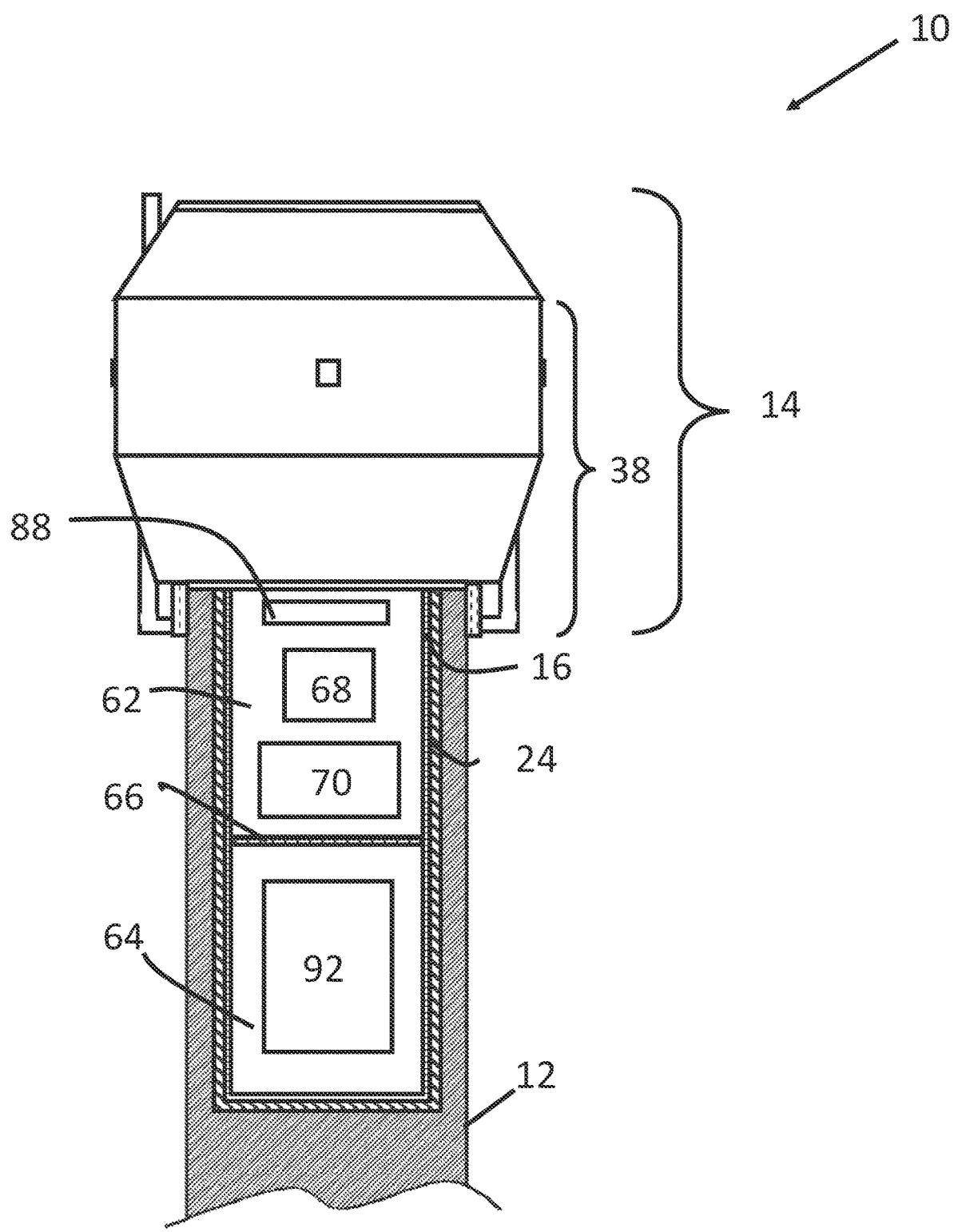
FIG. 5A is an orthogonal cut-away view of a security device secured to an existing structure taken along line A-A of FIG. 1.

In an embodiment, projections 52 may be screw threads or a similar structure, such that when base 16 is secured within cavity 24, projections 52 interact with internal surface 56 of structure 12. In yet another embodiment, base 16 is secured within cavity 24 via adhesive, nails, press-fitting, screws, nuts, and bolts, or any other method or combination of methods known in the art, thereby negating the need for projections 52 or projection receipts 58, entirely. Furthermore, when security device 10 is disposed within cavity 24 of structure 12, flange 60 of base 16 abuts a surface of structure 12. Flange 60 provides a visual indication as to when base 16 is fully seated and secured within structure 12, as depicted in FIG. 5A.

Head Component

Figure 3B:
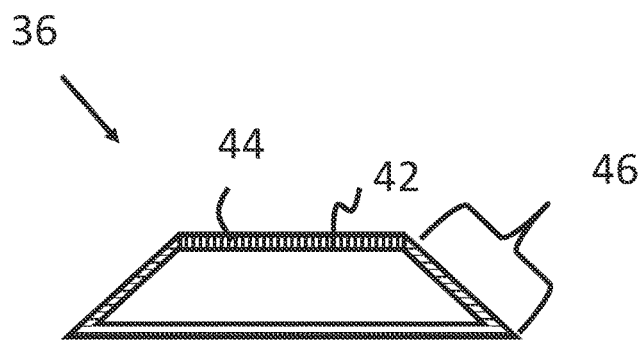
FIG. 3B is an orthogonal cut-away view of the top section of the head taken along line C-C of FIG. 3A.
Figure 3A:
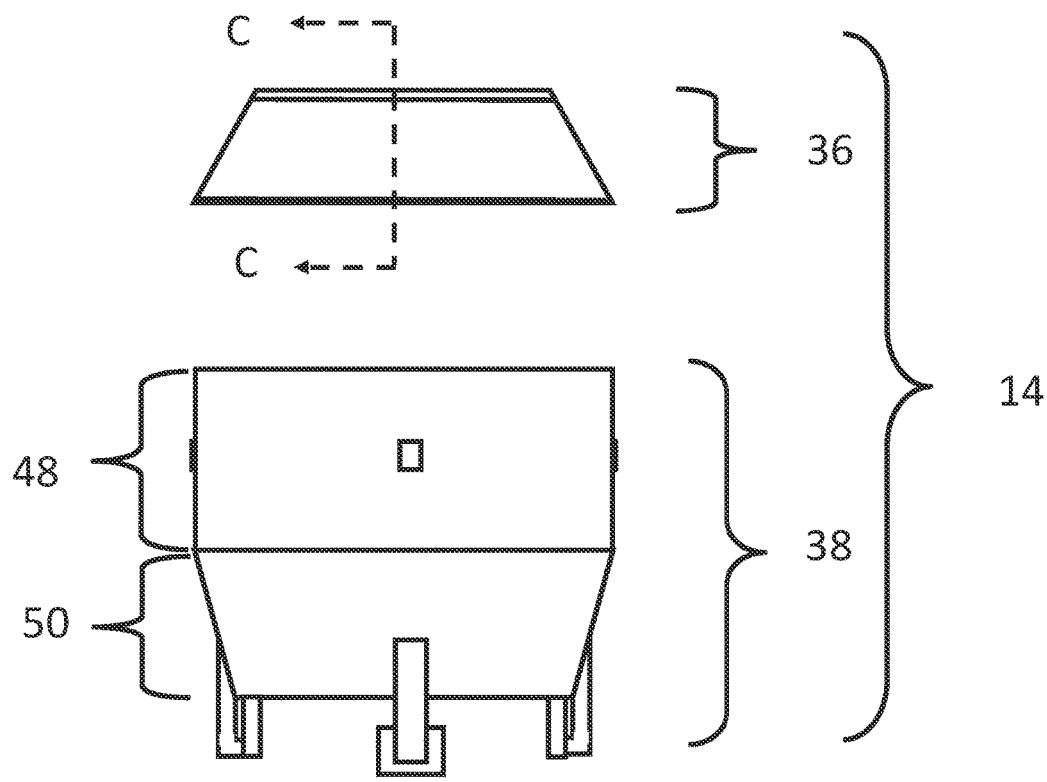
FIG. 3A is an exploded view of the head of the security device.
Figure 3C:
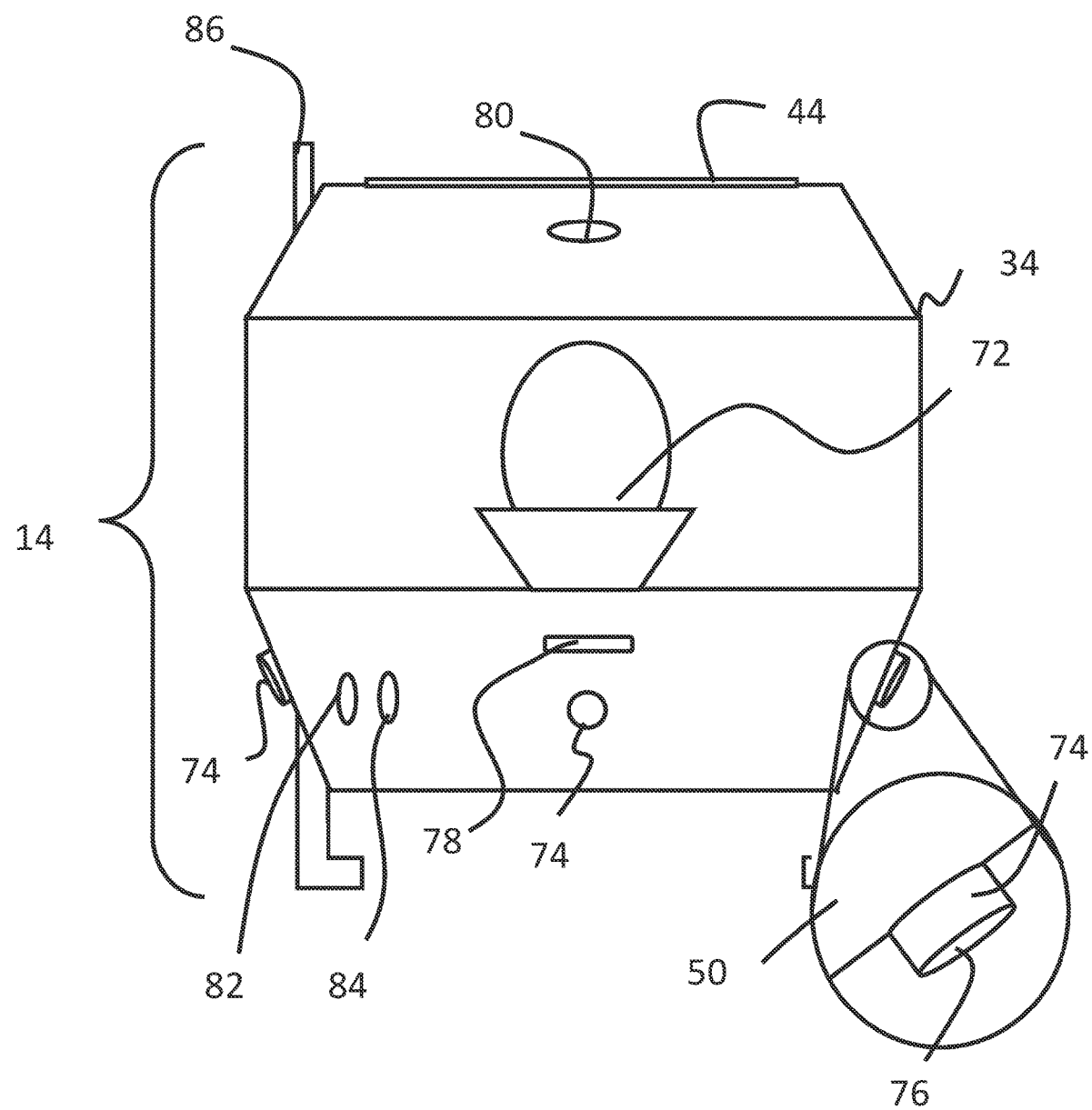
FIG. 3C is an orthogonal view of the head of the security device.

As shown in FIGS. 3A-3C, head 14 is constructed of metal, plastic, carbon fiber, and/or other suitable materials that provide sufficient structural rigidity and support. To aid in enhancing the discrete and covert nature of security device 10, head 14 includes outer body 34 having an external appearance of objects commonly found within the area of interest to prevent its detection. For example, the object may be a light fixture, fountain, lawn fixture, lawn decoration, or other routinely positioned within the particular area of interest being monitored. As such, by having head 14 resemble common objects within the area of interest, the chance that a third-party would detect security device 10 is greatly reduced.

To provide for ease of repair and maintenance, head 14 is formed having at least two sections, namely top section 36 and bottom section 38. By constructing head 14 of separate structural and swappable components, a user can easily access internal components disposed within head 14 to provide a user or technician with easy access for repair and replacement of internal components.

As depicted in FIG. 3B, top section 36 includes receipt 42 configured to receive photovoltaic solar cell 44 (e.g., solar panel 44). Top tapered surface 46 is disposed about the perimeter of top section 36 and extends away at a predetermined distance and angle. In particular, top section 36 includes an upper surface having a width smaller than that of a connecting surface, such that top tapered surface 46 connects the upper surface and the connecting surface.

Referring generally to FIG. 3A-3C, internal components of head 14 include illumination device 72. In such embodiments, security device 10 is capable of functioning as both a source of light and a covert security monitoring system. In an embodiment, illumination device 72 is a light-emitting device (LED) that is activated via a switch, environmental lighting conditions, or motion. In such embodiments, similar-looking devices are used as decoys to avert the attention of an intruder and allow the system to blend into the surrounding infrastructure. For example, a security system can be sold in "kits" that include three "decoy" lighting fixtures and one "monitoring" fixture thereby, providing the appearance that the system includes a plurality of light fixtures designed for the home rather than a security system and camera.

In an embodiment, bottom portion 38 of head 14 includes transparent section 48 disposed adjacent to bottom tapered surface 50. Bottom tapered surface 50 includes a lower surface having a width smaller than that of a connecting surface, such that bottom tapered surface 50 connects the lower surface and the connecting surface. Transparent section 48 permits light to be emitted from illumination device 72 to exit head 14 and illuminate the area of interest. Bottom section 38 forms the structural support of head 14 and houses several internal components, as discussed below.

To capture video data from an area surrounding security device 10, head 14 includes one or more cameras 74 integrated within a single security device 10. In such an embodiment, each camera 74 has a 90° field of view, such that each subsequent camera 74 provides an additional 90° field of view, with 360° of visibility provided by four cameras within a single security device 10. Each camera 74 includes lens 76, such as an ultra-wide-angle lens, such as a tapered fish-eye lens for monitoring. For example, a 2.5 mm fish-eye lens is used to maximize the viewing angle; however, lenses 76 of various sizes and types may be used. For example, lenses 76 may include a standard lens, macro lens, telephoto lens, or others depending on the need of the user and the design of the particular security system and area of interest being monitored.

Figure 4A:
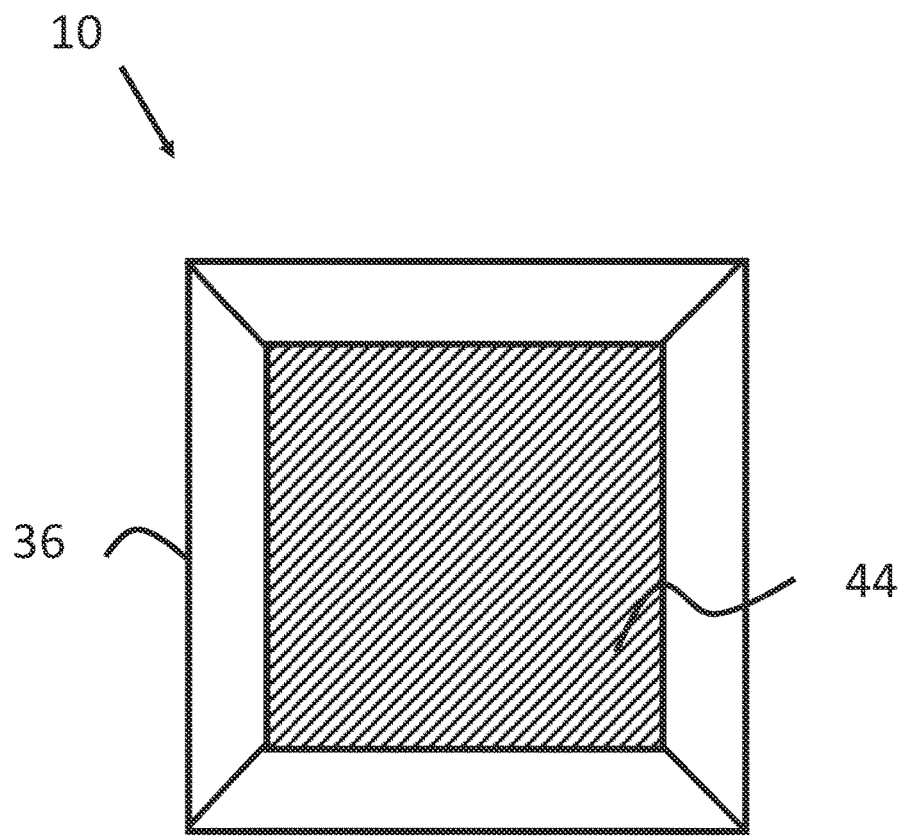
FIG. 4A is a top view of a security device showing the solar panel disposed within the receipt of the top section.
Figure 4B:
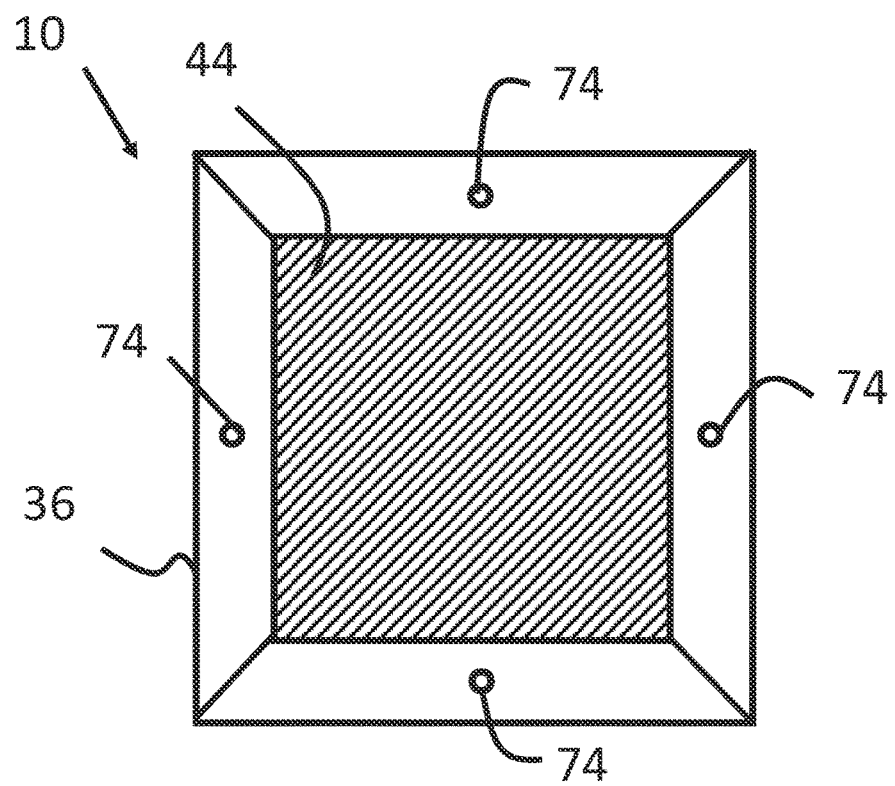
FIG. 4B is a top view of a security device showing the solar panel disposed within the receipt of the top section having a plurality of pinhole cameras disposed within the tapered top edge.

Camera 74 may further include a high definition (HD) camera, such as one that is capable of capturing and transmitting 4K video to a user interface device (UID). It is important that each camera 74 is positioned as discreetly as possible to avoid inadvertent camera 74 detections by possible intruders or offenders within the area of interest. In particular, one or more cameras 74 may be positioned on top tapered surface 46 or bottom tapered surface 50, such that the tapered portion of each of the top 46 and bottom 50 tapered surface conceals cameras 74 from the view of a third party. Additionally, embodiments that utilize a pinhole style camera, in which camera 74 protrudes less than ¼ inch away from outer body 34 of the security device 10 allows for discrete positioning of cameras 74. Accordingly, when the pinhole style cameras are position on top 46 and bottom 50 tapered surface, the covert nature of both the tapered surfaces and pinhole style camera is further amplified. However, embodiments in which camera 74 sits flush with outer body 34 or just below the surface may also be implemented. Furthermore, in situations in which monitoring requires additional camera views at elevations above and below security device 10, additional cameras 74 may be disposed within security device 10 accordingly to provide complete coverage of the entire area of interest, as illustrated in FIGS. 4A, and 4B.

In an embodiment, camera 74 is capable of viewing visible and infrared (IR) wavelengths of light. In particular, security device 10 contains full infrared lighting capabilities, such as infrared LED (IR LED) 78, to enable camera 74 to record images during periods of low visible light conditions. In such embodiments, IR LED 78 may emit wavelengths of light within the 700 and 1050 nm range. During low light conditions, ambient light sensor 80 may trigger IR LED 78 to activate.

Alternatively, IR LED 78 is activated once the supplied voltage of solar panel 44 drops below a predetermined voltage level for a predetermined period of time. For example, as the sun sets in the distance, less sunlight will be available to power solar panel 44. In such cases, once the power level has dropped below a threshold amount, logic board 88 (see FIG. 5A) located within base 16 recognizes the low light condition and switches on IR LED 78 and/or illumination device 72.

In an embodiment, one or more solar panels 44 are composed of a plurality of solar cells. As discussed above, solar panels 44 are secured to top section 36 of outer body 34. Solar panels 44 are configured to convert solar energy into A/C or D/C current, such that solar panels 44 provide a source of electricity to power security device 10 or recharge interconnected batteries 70 when the charge of interconnected batteries 70 in base 16 drops below a threshold amount.

To provide for additional monitoring and communication, internal components may further include microphone 82, speaker 84, and additional sensors 86. This gives the user the option for passively or actively monitoring the area of interest. Such monitoring consists of audio and visual (A/V) capabilities, motion detection, and environmental monitoring through sensors 86.

Base Component

Figure 5B:
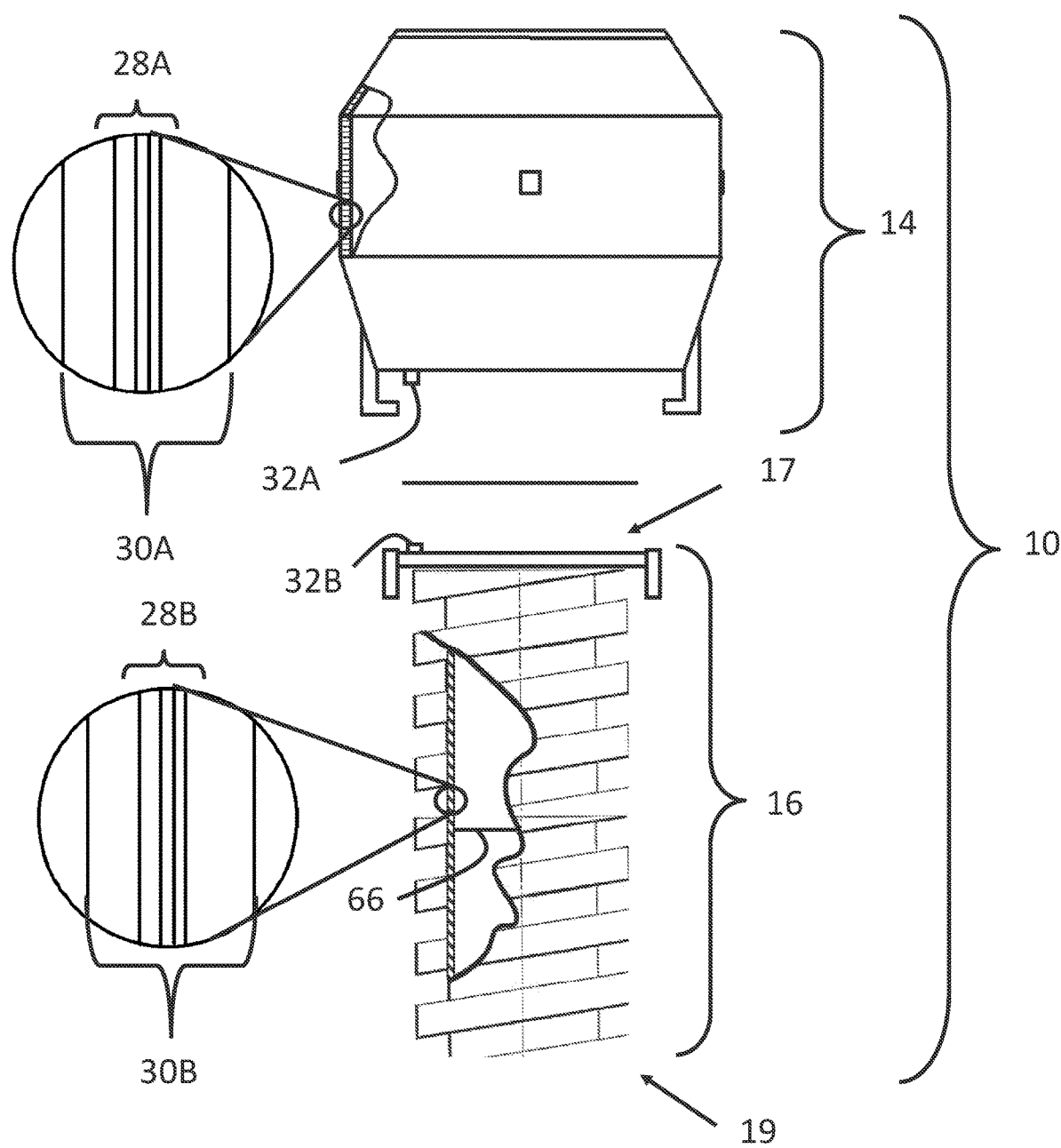
FIG. 5B is an exploded view of the security device.

As depicted in FIGS. 5A and 5B, base 16 is formed having storage compartment 62 and covert compartment 64 separated by partition 66. Storage compartment 62 is disposed in closer proximity to top portion 17 of base 16 than covert compartment 64. Covert compartment 64 is disposed in closer proximity to bottom portion 19 of base 16 than storage compartment 64. Partition 66 separates storage compartment 62 from covert compartment 64 and functions to conceal and hide from view covert compartment 64. Covert compartment 64 is configured to house one or more additional internal components from view, when head 14 is operably removed from base 16.

Accordingly, because base 16 is secured within cavity 24, when head 14 is dissociated or removed from base 16, the base remains secured in place within cavity 24. In such situations when head 14 is dissociated, only storage compartment 62 is visible to a third party due to partition 66 separating storage compartment 62 from covert compartment 64. This is important because one or more internal components that are critical for the functionality of security device 10 can be safely and covertly housed with covert compartment 64 without a third party noticing them.

As such, if a third party, such as a criminal, attempts to remove security device 10 from structure 12 by dissociating head 14 from base 16, the criminal falsely believes they have successfully disabled and/or removed security device 10—including its internal components. Furthermore, security device 10 continuously records the criminal theft event and either transmits audio and video data to UID 90 (see FIG. 6) or stores the data on storage device 92 (see FIG. 5A) located within covert compartment 64. In addition, audio and visual data is transmitted to a remote storage platform, such as cloud storage, server(s), remote solid-state drives (SSD), or similar storage means. This permits the theft event to be recorded and sent to the proper authorities for prosecution. Additionally, security device 10 records and stores audio and visual information on remote and/or digital storage devices 92, such as cloud storage, server(s), solid-state drive (SSD), or similar storage means located within covert compartment 64.

To enable electric communication between head 14 and base 16, first plurality of wires 28A and second plurality of wires 28B (collectively "wires 28") are provided. Wires 28 can be configured to transmit and receive data, such as video and audio data, or alternatively, may be used as a source of power. To remain covert, first plurality of wires 28A are disposed within sidewall 30A of head 14 and second plurality of wires 28B are disposed within sidewall 30B of base 16. Sidewall 30 provides a path for wires 28 to travel and remain hidden from view of third parties. When wires 28 are disposed within sidewalls 30A and 30B, wires 28 run between top portion 17 and bottom portion 19 of base 16 without being seen or noticed.

Additionally, a plurality of contact connectors 32 may be provided that allows for discrete cabling and reduce the visibility of wires 28. In such an embodiment, first contact connector 32A is disposed on head 14 and second contact connector 32B is disposed on base 16, such that when head 14 is positioned adjacent to base 16, contact connectors 32A and 32B are positioned adjacent to each other, such that the connection between contact connectors 32A and 32B enables the transmission of data and/or power discretely.

Base 16 further comprises power source 68 that is configured to supply power to security device 10. Power source 68 includes a primary power source and an optional secondary power source. Power source 68 may include a dedicated source of alternating current (A/C) or direct current (D/C) power in various voltages—including 120V and 240V. For example, security device 10 may be operatively coupled directly into the existing power supply of structure 12. Power source 68 is in electrical communication with one or more interconnected batteries 70. Batteries 70 supply electrical power to security device 10 in the event of a temporary and/or permanent loss of power source 68. In particular, interconnected batteries 70 are configured to store enough energy such that security device 10 can be operated for an extended period of time without needing to be recharged. Having interconnected batteries 70 increases the portability of security device 10 and permits its mounting and operation virtually anywhere. When security device 10 is coupled to structure 12, interconnected batteries 70 are configured to be disposed within storage compartment 62 of base 16, thereby permitting larger battery packs to be used, while at the same time ensuring that security device 10 remains as covert and hidden as possible.

Mesh Network Communication

Figure 6:
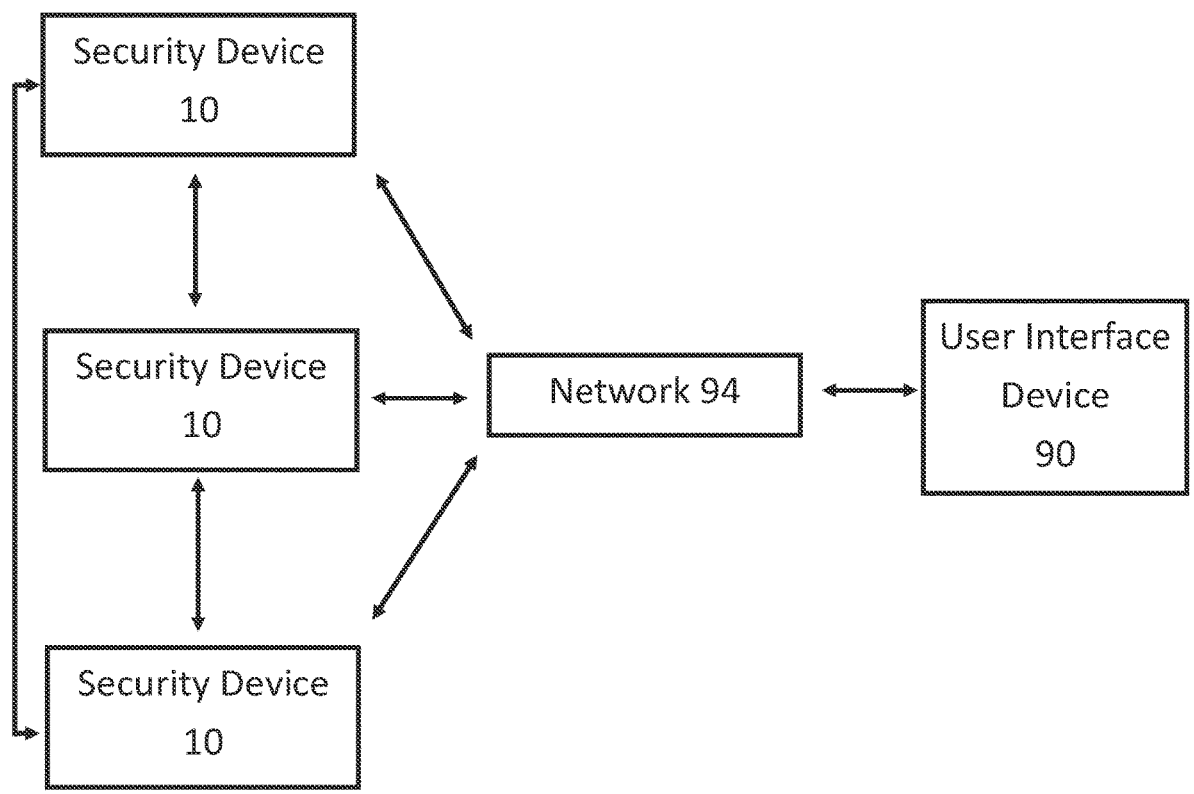
FIG. 6 is a network diagram depicting the communication paths between the security devices and a monitoring device.

As shown in FIG. 6, security device 10 is in wireless electronic communication with one or more additional security devices 10 or user interface device (UID) 90 via network 94, such as a wireless or cellular network. For added security, security device 10 creates its own dedicated wireless or wired network that is a separate network 94 from that of an existing home or business network. By creating a dedicated wireless network 94, the security system increases security protection, thereby preventing unauthorized users from accessing the system. Network 94 communication may be enabled through wireless components within security device 10, such as a wireless networking card or via a hardwired connection, such as through an ethernet port. Furthermore, when the dedicated wireless network is running, UID 90 can connect to dedicated network 94, creating a secure connection without the need for a router.

Network 94 may be a Wi-Fi network that is compatible with existing wireless standards, such as IEEE 802.11. In an embodiment, network 94 also includes or more local area networks (LAN), wide area networks (WAN), virtual private networks (VPN), long-term evolution (LTE) networks, cellular networks including 4G and 5G, or similar networks. In addition, security device 10 communicates with one or more additional security devices 10 or UIDs 90 via Bluetooth radio, radio waves, infrared, near field communication, universal serial bus (USB), thunderbolt, or similar connection or connection ports known in the art.

Furthermore, one or more security devices 10 functions to create a multi-node mesh network 94, in which each security device 10 includes wireless capabilities. Each security device 10 includes a node that acts as the broadcast method to stream and/or download video, as well as to receive and transmit programming instructions to one or more security device 10. Each node is preprogrammed with a static IP address on a class C format gateway to create a secure network. However, it should be appreciated that the programming of each node can include other classes, such as class A and class B. The nodes can also be configured to broadcast a dynamic IP address. When initializing security device 10, the node will prompt the user to change a password, connect to additional nodes, and/or change and add to the existing network 94. When adding security devices 10 to the network, security checks and verifications may be required. For example, upon integrating one or more additional security devices 10 a user will be required to provide one or more of the following: unique individual code, password to existing security device 10, mac address of new security device 10, name (SSID) of an existing network, or other security verification methods known in the art.

The nodes are configured to work in conjunction with one another to create a robust and secure network 94 and extend the signal range of network 94, allowing stronger signals for computing devices connected to network 94. Once network 94 has three or more security devices 10 connected and online, network 94 creates a mesh coverage that enables multiples routes for data to travel within the network, thereby improving the transmission of information between devices 10 and a computing device. As such, in the event of a failure at any security device 10, the mesh network permits the other security devices 10 still connected to the network to remain broadcasting and secure. Accordingly, a user experiences little to no downtime in the event of a network failure at a single node, thereby improving the security of the system, since an area of interest continues to be monitored throughout the singular node failure. In yet another embodiment, security device 10 acts as a wireless repeater or extender, such that security device 10 expands network 94 to cover a larger geographic area.

Figure 7:
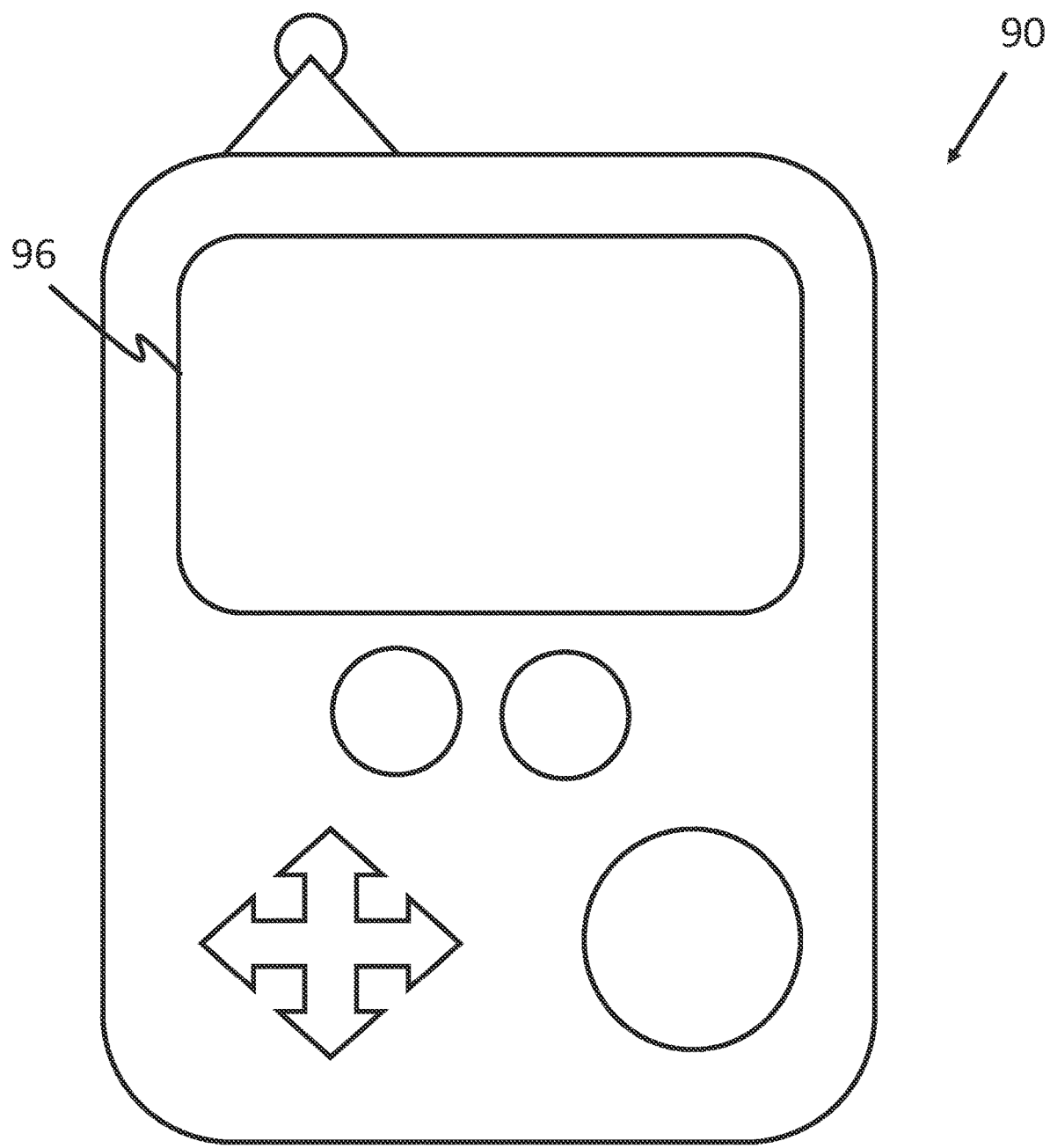
FIG. 7 is an orthogonal view of a user interface device for interacting with and controlling the security device.

Security device 10 interacts and/or communicates with a homeowner or other user(s) via the mesh network or via the user's home network, for example, through UID 90, as depicted in FIG. 7. In particular, UID 90 may comprise a cellular device, mobile tablet, laptop, desktop, or other similar electronic devices that enable a user to control, monitor, and/or operate security devices 10 directly or remotely from anywhere in the world. In such embodiments, UID 90 and security device 10 is equipped with software, including machine learning software. UID 90 may also include video display 96 and related components to receive and transmit A/V information along with other data about security device 10 and/or area of interest.

During operation, security device 10 is configured to be on as a default, activated by a command sent to security device 10 via the UID 90, or activated when an object or event, such as a person or animal walking within the area of interest, triggers security device 10 to activate and begin recording. When such an event occurs, security device 10 sends an alert to UID 90 and may begin recording A/V data. In an embodiment, security device 10 streams live A/V data to UID 90 upon alert or instruction from UID 90. If a user accepts the alert, two-way A/V communication is then enabled. When the user is connected to security device 10 via either a wired or wireless connection, the user may perform one or more functions, such as repositioning camera 74, turning on or off various settings and parameters, or asserting general control over security device 10.

Security System Kit

Figure 8:
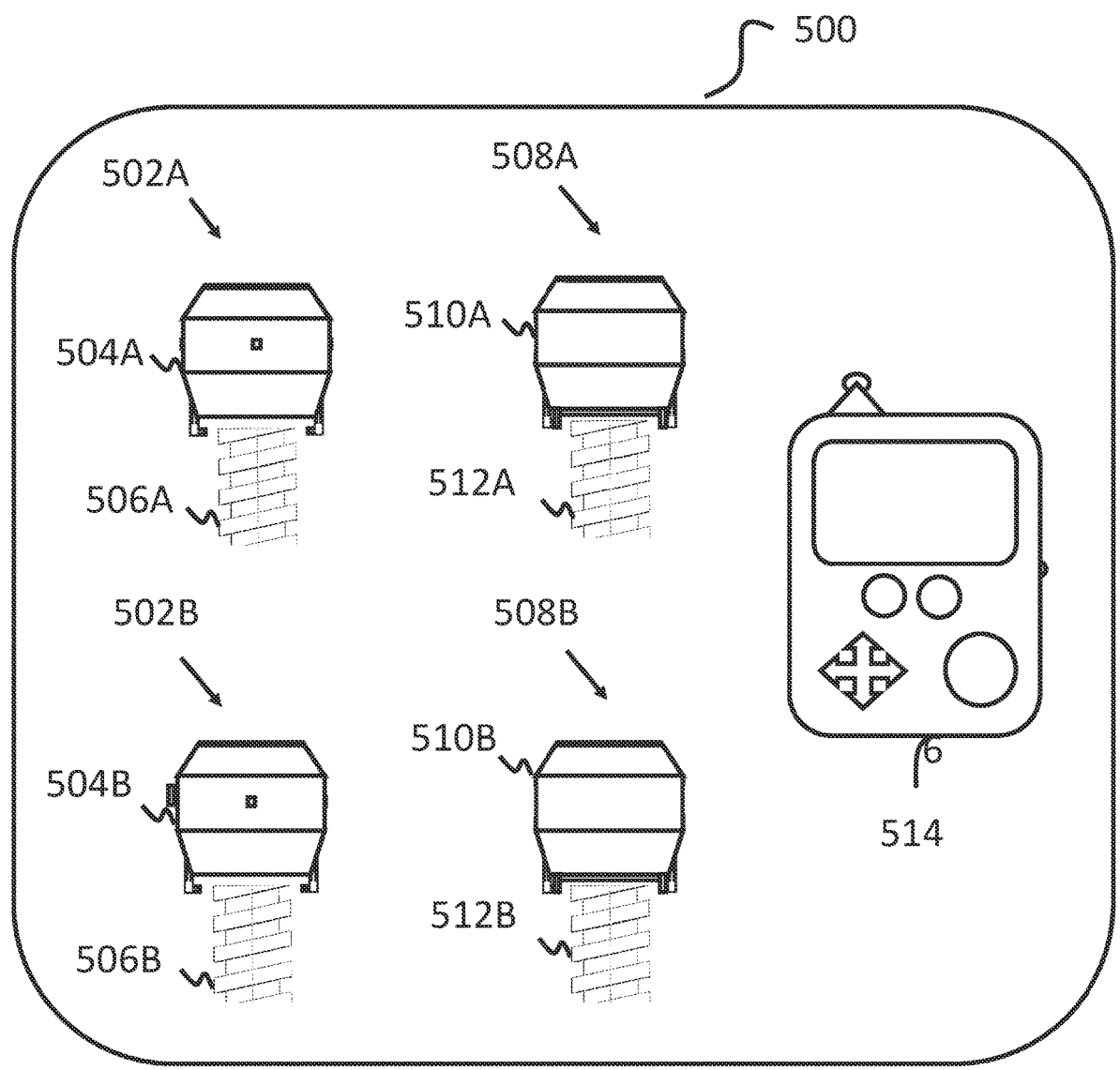
FIG. 8 is a perspective view of a kit including a plurality of decoy devices, a plurality of covert security devices, and a user interface device in accordance with an embodiment of the present invention.

FIG. 8 depicts covert security camera kit 500, which includes at least one covert security device 502A having head 504A and base 506A and at least one decoy device 508A having head 510A and base 512B. Kit 500 also includes communication device 514 configured to control the at least one covert security device 502A and the at least one decoy device 508A. As shown in FIG. 8, an embodiment of covert security system kit 500 includes a plurality of covert security devices 502A and 502B along with a plurality of decoy devices 508A and 508B. Accordingly, covert security camera kit 500 includes all of the components to build your own security monitoring set-up in your own unique area of interest, without the need to locate the component parts separately.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A security device configured to be secured to a structure to monitor an area of interest surrounding the structure, the security device comprising:
    a head operably and removably coupled to a base, the head including:
        a main body disposed between a top section and a bottom section; and
        a camera secured to the main body, the camera including a lens disposed on a surface of the main body, wherein the surface is configured to conceal the camera from view;
    the base including:
        an outer surface spanning from a top end to a bottom end;
        an inner surface opposite the outer surface, the inner surface defining a cavity therein;
        a visible compartment disposed within the cavity, the visible compartment configured to receive a first internal component therein;
        a covert compartment disposed beneath the visible compartment and separated from the visible compartment by a partition, the covert compartment housing a second internal component therein; and
        the partition being translatable between an open configuration and a closed configuration, wherein the covert compartment is visible in the open configuration and concealed in the closed configuration,
    wherein the security device is configured to be secured to the structure via the base and is configured to monitor the area of interest surrounding the structure via the camera.

2. The security device of claim 1, further comprising a first attachment mechanism disposed at the bottom section of the head and a second attachment mechanism disposed at the top end of the base, wherein the second attachment mechanism is configured to operably and removably secure to the first attachment mechanism of the head.

3. The security device of claim 1, wherein the outer surface of the base is configured to engage with an internal surface of a cavity defined within the structure, thereby securing the securing device to the structure.

4. The security device of claim 1, wherein the first internal component is a power supply configured to supply power to the security device.

5. The security device of claim 1, wherein the second internal component is a storage device, the storage device in wireless communication with the camera and configured to store data captured by the camera.

6. The security device of claim 1, wherein the head further comprises an illumination device secured within the head, wherein the illumination device is configured to illuminate the area of interest during periods of low ambient light.

7. The security device of claim 1, further comprising:
a first plurality of wires disposed within the head, the first plurality of wires being operably coupled to a first connector disposed at the bottom section of the head;
a second plurality of wires residing within a sidewall of the base, the second plurality of wires being operably coupled to a second connector disposed at the top end of the base;
wherein when the head is coupled to the base, the first connector is positioned adjacent to the second connector, thereby operably coupling the first connector with the second connector.

8. The security device of claim 1, wherein the head further comprises a photovoltaic solar cell residing within a receipt formed within the top section of the head, the photovoltaic solar cell operably coupled to the first internal component residing within the visible compartment and configured to supply power to the first internal component.

9. The security device of claim 1, wherein the security device is in wireless communication with a user interface device residing in an environment external to the area of interest, the user interface device configured to control the security device remotely.

10. A security device configured to be secured to a structure to monitor an area of interest surrounding the structure, the security device comprising:
a head operably and removably coupled to a base, the head including:
a main body having an outer surface, the main body disposed between a top section and a bottom section;
a first pinhole camera secured to the bottom section, the first pinhole camera including a first lens disposed on the outer surface of the main body;
a second pinhole camera secured to the top section, the second pinhole camera including a second lens disposed on the outer surface of the main body; and
a first attachment mechanism disposed on the bottom section;
the base including:
an outer surface spanning from a top end to a bottom end, the top end including a second attachment mechanism configured to operably and removably secure to the first attachment mechanism of the head, the outer surface of the base configured engage with a cavity defined within the structure, thereby securing the base to the structure;
an inner surface opposite the outer surface of the base, the inner surface of the base defining a cavity therein;
a visible compartment disposed within the cavity, the visible compartment housing a first internal component therein;
a covert compartment disposed beneath the visible compartment and separated from the visible compartment by a partition, the covert compartment housing a second internal component therein; and
the partition being translatable between an open configuration and a closed configuration, wherein the covert compartment is visible in the open configuration and concealed in the closed configuration, wherein the security device is configured to be secured to the structure via the base and is configured to monitor the area of interest surrounding the structure via the head.

11. The security device of claim 10, further comprising a gasket disposed between the head and the base, wherein the gasket is configured to create an airtight and watertight seal when the head is operably and removably secured to the base.

12. The security device of claim 10, wherein the head further comprises an illumination device secured within the bottom section of the head, wherein the head is configured to illuminate the area of interest during periods of low ambient light.

13. The security device of claim 10, further comprising:
a first plurality of wires disposed within the head, the first plurality of wires being operably coupled to a first connector disposed at the bottom section of the head;
a second plurality of wires residing within a sidewall of the base, the second plurality of wires being operably coupled to a second connector disposed at the top end of the base;
wherein when the head is coupled to the base, the first connector is positioned adjacent to the second connector, thereby operably coupling the first connector with the second connector.

14. The security device of claim 10, wherein the head further comprises a photovoltaic solar cell residing within a receipt formed within the top section of the head, the photovoltaic solar cell operably coupled to the first internal component and configured to supply power to the first internal component.

15. The security device of claim 10, wherein the covert security device is in wireless communication with a user interface device residing in an environment external to the area of interest, the user interface device configured to control the covert security device remotely.

16. A security monitoring system configured to monitor an area of interest, the security monitoring system comprising:
at least one security device configured to monitor an area of interest, the at least one security device comprising:
a head operably and removably coupled to a base, the head including:
a main body disposed between a top section and a bottom section;
a camera secured to the main body, the camera including a lens disposed on a surface of the main body, wherein the surface is configured to conceal the camera from view; and
a first attachment mechanism disposed on the bottom section;
the base including:
an outer surface spanning from a top end to a bottom end;
an inner surface opposite the outer surface, the inner surface defining a cavity therein;
a visible compartment disposed within the cavity, the visible compartment configured to receive a first internal component therein;
a covert compartment disposed beneath the visible compartment and separated from the visible compartment by a partition, the covert compartment housing a second internal component therein; and
the partition being translatable between an open configuration and a closed configuration, wherein the covert compartment is visible in the open configuration and concealed in the closed configuration; and at least one decoy device spaced apart from the at least one security device, the at least one decoy device having a head and a base equivalent to that of the at least one security device;

wherein the at least one security device is configured to be secured to the structure via the base and is configured to monitor the area of interest surrounding the structure via the head, such that data captured by the camera of the head is stored within the storage device of the base, and wherein the at least one decoy device is configured to resemble an appearance of the at least one security device.

17. The security monitoring system of claim 16, wherein the at least one security device further comprises:

a first plurality of wires disposed within the head, the first plurality of wires being operably coupled to a first connector disposed at the bottom section of the head;

a second plurality of wires residing within a sidewall of the base, the second plurality of wires being operably coupled to a second connector disposed at the top end of the base;

wherein when the head is coupled to the base, the first connector is positioned adjacent to the second connector, thereby operably coupling the first connector with the second connector.

18. The security monitoring system of claim 16, wherein the head of the at least one security device further comprises a photovoltaic solar cell residing within a receipt formed within the top section of the head, the photovoltaic solar cell operably coupled to the first internal component and configured to supply power to the first internal component.

19. The security monitoring system of claim 16, wherein the head of each of the at least one decoy device and the at least one security device further comprises an illumination device secured within the bottom section of thereof, wherein each head is configured to illuminate the area of interest during periods of low ambient light.

* * * * *